United States Patent [19]

Nomura

[11] 4,337,792
[45] Jul. 6, 1982

[54] FLUID RESERVOIR FOR BRAKE MASTER CYLINDERS

[75] Inventor: Yoshihisa Nomura, Toyota, Japan

[73] Assignee: Toyota Jidosha Kogyo Kabushiki Kaisha, Aichi, Japan

[21] Appl. No.: 161,335

[22] Filed: Jun. 20, 1980

[30] Foreign Application Priority Data

Jun. 29, 1979 [JP] Japan .................. 54-90580[U]

[51] Int. Cl.³ ........................................ F15B 7/10
[52] U.S. Cl. ........................... 137/558; 60/535; 60/592; 137/854
[58] Field of Search ............... 60/534, 535, 545, 592, 60/585; 137/558, 572, 854

[56] References Cited

U.S. PATENT DOCUMENTS

| | | | |
|---|---|---|---|
| 3,945,474 | 3/1976 | Palmer | 137/854 |
| 4,136,712 | 1/1979 | Nogami | 60/535 |
| 4,181,147 | 1/1980 | Fujii | 60/592 |
| 4,192,345 | 3/1980 | Fujii | 60/592 |

FOREIGN PATENT DOCUMENTS

| | | | |
|---|---|---|---|
| 2636607 | 2/1977 | Fed. Rep. of Germany | 60/534 |
| 202028 | 7/1965 | Sweden | 137/854 |
| 568856 | 4/1945 | United Kingdom | 137/854 |

*Primary Examiner*—Abraham Hershkovitz
*Attorney, Agent, or Firm*—Armstrong, Nikaido, Marmelstein & Kubovcik

[57] ABSTRACT

In a fluid reservoir for a brake master cylinder, a cap member of elastic material is coupled over the upper opening of a casing, and a diaphragm seal member is coupled within the cap member to subdivide the interior space of the casing into upper and lower chambers. The seal member is provided at its outer periphery with an inlet check valve assembly and at its inner periphery with an outlet check valve assembly. The inlet check valve assembly is characterized by an annular valve seat in the form of a lower stepped portion in the cap member, a cylindrical retainer secured to the outer periphery of the seal member and having an annular flange facing to an upper stepped portion in the cap member, an annular lip of elastic material integral with the flange of the retainer, and a spring loading the retainer toward the upper stepped portion.

4 Claims, 3 Drawing Figures

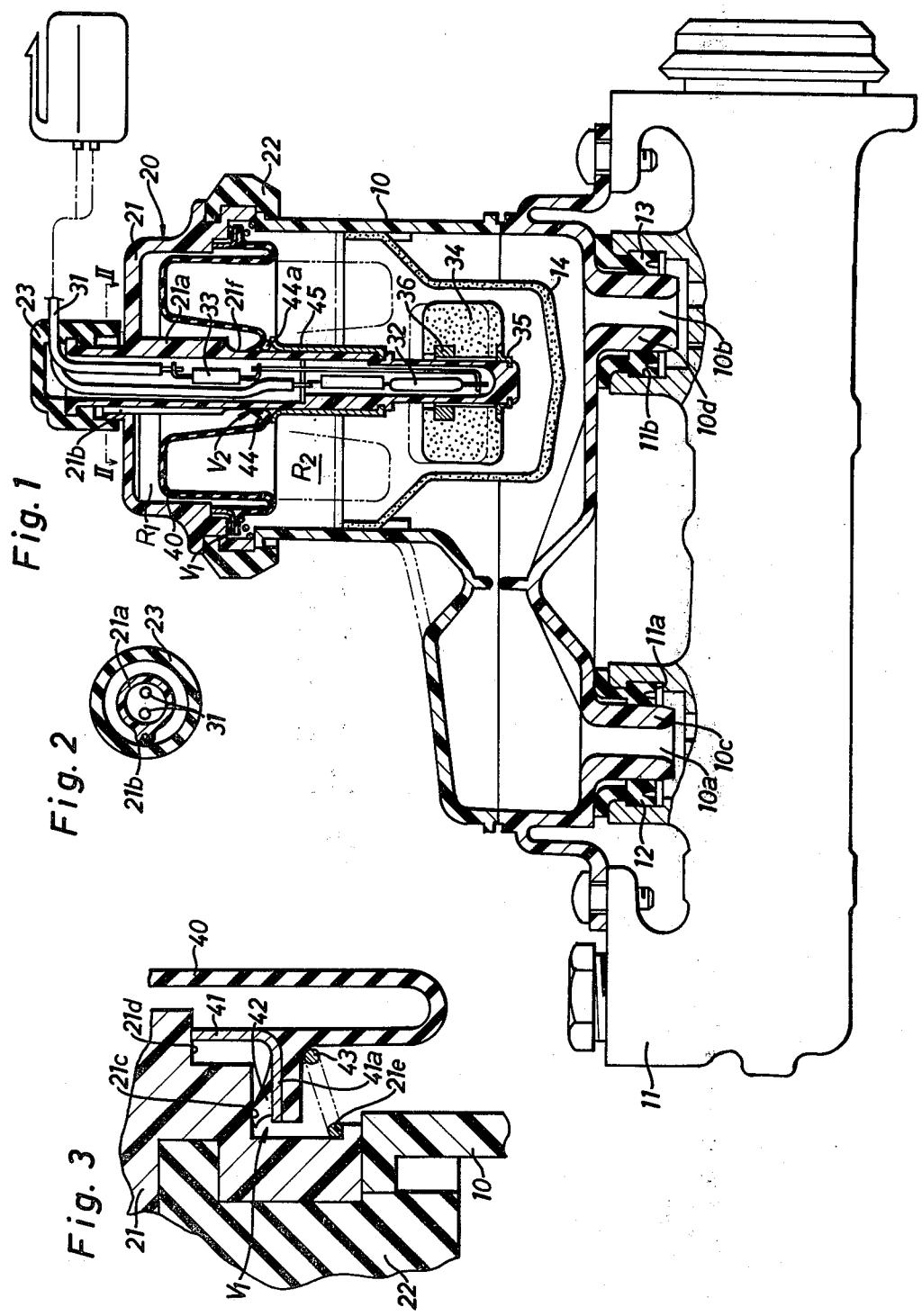

FLUID RESERVOIR FOR BRAKE MASTER CYLINDERS

BACKGROUND OF THE INVENTION

The present invention relates to a fluid reservoir for mounting on a brake master cylinder, and more particularly to a fluid reservoir of the type which includes a diaphragm seal member coupled within a cap assembly of the reservoir casing to close off brake fluid stored in the casing from the surrounding air.

In such a conventional fluid reservoir as described above, the diaphragm seal member is expanded upward or downward in accordance with inflation or deflation of the air in the closed space to maintain the pressure in the closed space substantially at the atmospheric pressure. If the pressure in the closed space becomes positive or negative under maximum extension of the diaphragm seal member, unexpected troubles will occur in the vehicle braking system. To solve the problems, a conventional diaphragm seal member is provided thereon with inlet and outlet check valves which act to permit the flow of air to and from the closed space. It is, however, difficult to make the performance of the fluid reservoir uniform by provision of the inlet and outlet check valves.

SUMMARY OF THE INVENTION

It is, therefore, the primary object of the present invention to provide an improved fluid reservoir in which inlet and outlet check valve assemblies are respectively arranged on the outer and inner peripheries of the diaphragm seal member to define each opening pressure of the check valve assemblies as precisely as possible thereby to make the performance of the fluid reservoir uniform.

Accordingly, in a preferred embodiment of the present invention, a cap member of elastic material is detachably coupled over the upper opening of a reservoir casing, and a diaphragm seal member is coupled within the cap member to close off brake fluid stored in the casing from the surrounding air, the seal member subdividing the interior space of the casing into an upper chamber vented through a portion of the cap member and a lower chamber located above the liquid surface of the brake fluid. The cap member is provided at its center with a vertical rod extending axially into the casing. The diaphragm seal member is provided at its outer periphery with an inlet check valve assembly for permitting the flow of air from the upper chamber into the lower chamber and provided at its inner periphery with an outlet check valve assembly which includes an annular valve seat in the form of the outer periphery of the vertical rod and an annular valve member integrally formed on the inner periphery of the diaphragm seal member for cooperating with the annular valve seat to permit the flow of air from the lower chamber into the upper chamber.

The present invention is directed to an improvement in which the inlet check valve assembly comprises an annular valve seat in the form of a lower stepped portion formed on the inner peripheral wall of the cap member, a cylindrical retainer member of hard material integrally secured to the outer periphery of the diaphragm seal member and having an annular flange facing to the annular valve seat and an upper end resiliently engageable with an upper stepped portion formed on the inner peripheral wall of the cap member, an annular lip of elastic material integrally formed on the annular flange of the retainer member, and resilient means for biasing the retainer member toward the upper stepped portion to press the annular lip into contact with the annular valve seat.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1 is an elevational view, in partially in section, of a brake master cylinder with a fluid reservoir in accordance with the present invention;

FIG. 2 is a cross-sectional view taken along line II—II in FIG. 1; and

FIG. 3 is an enlarged view for clearly showing a first check valve assembly arranged on the outer periphery of the diaphragm seal member of FIG. 1.

DESCRIPTION OF THE PREFERRED EMBODIMENT

Referring now to the drawing, particularly in FIG. 1, a reservoir casing 10 is mounted on a brake master cylinder 11 to constantly store an amount of brake fluid therein as a supply for the master cylinder. The reservoir casing 10 is provided at its bottom portion with tubular bosses 10c and 10d which are coupled in a fluid-tight manner within ports 11a and 11b of the master cylinder 11 via annular seal members 12 and 13 respectively, the bosses 10c, 10d forming respective ports 10a and 10b of the reservoir casing 10. Within the casing 10 an oil strainer 14 is provided to filter out contaminants which may enter into the casing 10. The upper opening of casing 10 is closed in a fluid-tight manner by a cap assembly 20 with an extendable diaphragm seal member 40 coupled thereto.

The cap assembly 20 includes a cap member 21 made of hard synthetic resin and a cap-ring 22 of synthetic rubber which is secured to the outer periphery of cap member 21 and detachably coupled over the upper opening of casing 10. The cap member 21 is integrally formed at its center with a stepped tubular rod 21a which extends vertically downward into the casing 10. A vertical vent hole 21b is provided along the left side of tubular rod 21a to connect the interior of cap assembly 20 to the exterior. A sub-cap 23 is coupled on the head of tubular rod 21a to cover the upper opening of vent hole 21b, which communicates with the exterior through the lower opening of sub-cap 23 around the head of tubular rod 21a.

The tubular rod 21a has a closed bottom and extends downward through an aperture in a float 34 which is positioned to float adjacent to the tubular rod on brake fluid stored in the casing 10. The tubular rod 21a is provided therein adjacent to the lower end portion thereof with a magnetically operable switch 32 in the form of a normally open reed switch which is connected through a resistor 33 to an external warning device A by way of lead wires 31 to issue a warning signal should a dangerous decrease in the quantity of brake fluid occur. The float 34 is arranged in the casing 10 for upward and downward movements in response to variations in the brake fluid level in the casing 10 and has an annular permanent magnet 36 secured thereon. The upward movement of float 34 is restricted by an upper stopper in the form of a lower stepped portion of rod 21a, and the downward movement of float 34 is restricted by a stopper 35 fixed to the lower end of rod 21a. Thus, the float 34 is retained by buoyancy in the upper position when adequate brake fluid is stored in the casing 10 and moves down in accordance with a fall in the level of the brake fluid. When the level of the brake fluid drops below a minimum fluid level, the float 34 engages the lower stopper 35 and the reed switch 32 closes due to the magnetic force of permanent magnet 36 of float 34 to energize the warning device so as to warn the driver of the shortage of brake fluid.

The diaphragm seal member 40 is made of elastic material such as synthetic rubber and is assembled within the cap member 21 to form upper and lower chambers $R_1$ and $R_2$. The upper chamber $R_1$ is in open communication with the exterior through vertical vent hole 21b, and the lower chamber $R_2$ is formed above the liquid surface of brake fluid in the casing 10. The diaphragm seal member 40 is provided at its outer periphery with a first check valve assembly $V_1$ permitting the flow of air from the upper chamber $R_1$ into the lower chamber $R_2$ and provided at its inner periphery with a second check valve assembly $V_2$ permitting the flow of air from the lower chamber $R_2$ into the upper chamber $R_1$.

As can be well seen in FIG. 3, the first check valve assembly $V_1$ includes an annular valve seat 21c in the form of a lower stepped portion formed on the inner peripheral wall of cap member 21 and an annular valve member 42 in the form of an annular lip integrally formed on the outer periphery of diaphragm seal member 40 through a cylindrical retainer 41. The annular valve member 42 is biased upward by a spiral coil spring 43, which is engaged at its one end with the outer periphery of diaphragm seal member 40 and at its other end with an annular rim 21e of cap member 21 with a predetermined load. The cylindrical retainer 41 is made of metal or hard synthetic resin and has an annular flange 41a facing to the annular valve seat 21c and an upper end resiliently pressed into contact with an upper stepped portion 21d formed on the inner periphery wall of cap member 21. The annular valve member 42 is integrally formed on the upper surface of the annular flange 41a and is resiliently pressed into contact with the annular valve seat 21c.

With the first check valve assembly $V_1$, the preload of spring 43 is easily determined in a desired value due to engagement of the upper end of retainer 41 against the stepped portion 21d of cap member 21. This enables to determine the opening pressure of valve assembly $V_1$ in a predetermined value as closely as possible. When the pressure in lower chamber $R_2$ reaches a predetermined negative value, the valve member 42 moves downward against the biasing force of spring 43 and instantly separates from the valve seat 21c to allow the flow of air from the upper chamber $R_1$ into the lower chamber $R_2$ so as to restrain the further decrease of pressure in lower chamber $R_2$.

The second check valve assembly $V_2$ includes an annular valve seat 21f in the form of the outer periphery of tubular rod 21a and an annular lip 44 integrally formed on the inner periphery of diaphragm seal member 40. The annular lip 44 is provided at its base with an annular rib which includes radial 44a permitting the flow of air therethrough. The annular lip 44 is also received by the upper end of a tubular retainer 45 which is fixed to an intermediate portion of rod 21a. Thus, the annular lip 44 is coupled over the tubular rod 21a at its annular rib and is pressed at its tip into contact with the valve seat 21f by its self-resiliency. The opening pressure of the second check valve assembly $V_2$ is determined approximately at a predetermined value provided that no manufacturing error exists in the annular lip 44 or the outer diameter of valve seat 21f. When the pressure in lower chamber $R_2$ reaches a predetermined positive value, the annular lip 44 instantly separates from the valve seat 21f to allow the flow of air from lower chamber $R_2$ into upper chamber $R_1$ through radial recesses 44a of lip 44 so as to restrain the further increase of pressure in lower chamber $R_2$.

In the use of the fluid reservoir described above, when the diaphragm seal member 40 is expanded within its flexible extent in accordance with inflation or deflation of the air in lower chamber $R_2$ caused by changes of the fluid level and/or the ambient temperature, both the check valve assemblies $V_1$ and $V_2$ are retained in their assembled positions to maintain the pressure in chamber $R_2$ substantially at the atmospheric pressure under the sealed condition. When the pressure in lower chamber $R_2$ reaches the predetermined positive value by inflation of the air caused by a rise in the ambient temperature after the diaphragm seal member 40 is expanded upward to its maximum flexible extent, as shown by a solid line in FIG. 1, the second check valve assembly $V_2$ is instantly opened to allow the flow of air from lower chamber $R_2$ into upper chamber $R_1$ so as to restrain the further increase of pressure in lower chamber $R_2$. When the pressure in lower chamber $R_2$ is decreased to the predetermined negative value by lowering of the fluid level or deflation of the air caused by a fall in the ambient temperature after the diaphragm seal member 40 is expanded downward to its maximum flexible extent, as shown by an imaginary line in FIG. 1, the first check valve assembly $V_1$ is instantly opened to allow the flow of air from upper chamber $R_1$ into lower chamber $R_2$ so as to restrain the further decrease of pressure in lower chamber $R_2$.

From the above description, it will be understood that both the check valve assemblies $V_1$ and $V_2$ serve to maintain the pressure in lower chamber $R_2$ substantially at the atmospheric pressure and to effectively prevent the entrance of water without exerting any other undesirable influence. In addition, when the level of fluid in the casing 10 drops below a minimum fluid level, the float 34 moves downward in response to the lowering of the fluid level and the reed switch 32 is closed due to the magnetic force of permanent magnet 36 to issue a warning signal. This energizes the warning device A to warn the driver of the shortage of brake fluid. It is also noted that the present invention may be adapted to various fluid reservoirs of such a diaphragm type as described above.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a fluid reservoir for mounting on a brake master cylinder, comprising a casing for storing an amount of brake fluid therein, said casing having an upper opening, a cap member of elastic material detachably coupled over the upper opening of said casing, and a diaphragm seal member coupled within said cap member to close off brake fluid stored in said casing and to subdivide the interior space of said casing into an upper chamber vented through a portion of said cap member and a lower chamber located above the liquid surface of the brake fluid, said diaphragm seal member being provided at the outer periphery thereof with an inlet check valve assembly for permitting the flow of air from the upper chamber into the lower chamber and provided at the central portion thereof with an outlet check valve assembly for permitting the flow of air from the lower chamber into the upper chamber, the improvement wherein said inlet check valve assembly comprises an annular valve seat in the form of a lower stepped portion formed on the inner peripheral wall of said cap member, a cylindrical retainer member of hard material integrally secured to the outer periphery of said diaphragm seal member and having an annular flange facing to said annular valve seat and an upper end resiliently engageable with an upper stepped portion formed on the inner peripheral wall of said cap member, an annular lip of elastic material integrally formed on the annular flange of said retainer member, and resilient means for biasing said retainer member toward the upper stepped portion of said cap member to press said annular lip into contact with said annular valve seat.

2. A fluid reservoir as claimed in claim 1, wherein said retainer member is made of metal, and said resilient means is a spiral compression coil spring engaged at its one end with the outer periphery of said diaphragm seal member and at its other end with an annular rim of said cap member to bias said retainer member upwardly toward the upper stepped portion of said cap member.

3. A fluid reservoir as claimed in claim 1, wherein said cap member is provided at its center with a vertical rod extending axially into said casing, and wherein said outlet check valve assembly comprises an annular valve seat in the form of the outer periphery of said vertical rod and an annular lip of elastic material integrally formed on the inner periphery of said diaphragm seal member for cooperating with said annular valve seat to permit the flow of air from the lower chamber into the upper chamber.

4. A fluid reservoir as claimed in claim 1, wherein said cap member is provided at its center with a vertical tubular rod, and further comprising warning means which includes a magnetically operable switch located adjacent to the lower end of said tubular rod and connected to an external warning device for issuing a warning signal, a float floatable on the brake fluid and located adjacent to said tubular rod, a permanent magnet mounted on said float and movable therewith to activate said switch when the level of brake fluid in said casing falls below a predetermined minimum level, and stop means on said tubular rod to restrict upward movement of said float.

* * * * *